United States Patent
Sun et al.

(10) Patent No.: US 11,204,291 B2
(45) Date of Patent: Dec. 21, 2021

(54) INTERFACE ULTRASONIC REFLECTIVITY-PRESSURE RELATION CURVE ESTABLISHMENT METHOD AND LOADING TESTBED

(71) Applicant: DALIAN UNIVERSITY OF TECHNOLOGY, Liaoning (CN)

(72) Inventors: Qingchao Sun, Liaoning (CN); Bo Yuan, Liaoning (CN); Wei Sun, Liaoning (CN); Weiqiang Huang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 516 days.

(21) Appl. No.: 16/172,342

(22) Filed: Oct. 26, 2018

(65) Prior Publication Data
US 2019/0064014 A1 Feb. 28, 2019

Related U.S. Application Data

(63) Continuation-in-part of application No. PCT/CN2017/089951, filed on Jun. 26, 2017.

(30) Foreign Application Priority Data

Apr. 28, 2017 (CN) .......................... 201710294916.6
Apr. 28, 2017 (CN) .......................... 201720465160.2

(51) Int. Cl.
*G01L 1/25* (2006.01)
*G01N 3/12* (2006.01)
(Continued)

(52) U.S. Cl.
CPC ................ *G01L 1/255* (2013.01); *G01N 3/08* (2013.01); *G01N 3/12* (2013.01); *G01N 3/42* (2013.01);
(Continued)

(58) Field of Classification Search
CPC ... G01L 1/25; G01L 1/255; G01N 2203/0019; G01N 2203/0658; G01N 2291/044;
(Continued)

(56) References Cited

U.S. PATENT DOCUMENTS

2009/0247873 A1* 10/2009 Kondo ................ G01S 7/52074
600/443

FOREIGN PATENT DOCUMENTS

CN 103278411 A 9/2013
CN 203455227 U 2/2014
(Continued)

OTHER PUBLICATIONS

Fei Du et al., "Contact Parameter Estimation with Ultrasonic Method", Journal of Xi'an Jiaotong University, Mar. 2013, vol. 47, No. 3, pp. 18-23.

*Primary Examiner* — Nimeshkumar D Patel
*Assistant Examiner* — Nashmiya S Fayyaz
(74) *Attorney, Agent, or Firm* — Novick, Kim & Lee, PLLC; Allen Xue

(57) ABSTRACT

The present invention discloses an interface ultrasonic reflectivity-pressure relation curve establishment method and a loading testbed. The loading testbed comprises a force displayer, a control terminal, an oscilloscope, an immersion ultrasonic transducer, a large cylinder, a small cylinder, an upper panel, a movable plate, a force sensor, a lower panel, an ultrasonic transceiver and a small cylinder connecting plate. Compared with the existing schemes, the interface ultrasonic reflectivity-pressure relation curve establishment method and the loading testbed provided by the present invention can construct a more accurate ultrasonic reflectivity-pressure relation curve, and are high in detection precision.

3 Claims, 3 Drawing Sheets

(51) Int. Cl.
*G01N 29/265* (2006.01)
*G01N 29/44* (2006.01)
*G01N 3/42* (2006.01)
*G01N 3/08* (2006.01)
*G01N 29/04* (2006.01)
*G01N 29/28* (2006.01)

(52) U.S. Cl.
CPC ........... *G01N 29/04* (2013.01); *G01N 29/265* (2013.01); *G01N 29/28* (2013.01); *G01N 29/4472* (2013.01); *G01N 2203/0019* (2013.01); *G01N 2203/0658* (2013.01); *G01N 2291/044* (2013.01)

(58) Field of Classification Search
CPC .......... G01N 29/265; G01N 3/08; G01N 3/12; G01N 29/04; G01N 29/28; G01N 29/4472; G01N 3/42
USPC .................................................. 73/622, 602
See application file for complete search history.

(56) References Cited

FOREIGN PATENT DOCUMENTS

| | | | |
|---|---|---|---|
| CN | 103616436 | A | 3/2014 |
| CN | 103822968 | A | 5/2014 |
| CN | 106932277 | A | 7/2017 |
| CN | 206696091 | U | 12/2017 |
| WO | 2015151035 | A1 | 10/2015 |

\* cited by examiner

INTERFACE ULTRASONIC REFLECTIVITY-PRESSURE RELATION CURVE ESTABLISHMENT METHOD AND LOADING TESTBED

TECHNICAL FIELD

The present invention relates to the technical field of ultrasonic detection, and particularly to an interface ultrasonic reflectivity-pressure relation curve establishment method and a loading testbed.

BACKGROUND ART

The performance of an interface has an important impact on performances of mechanical equipment, such as the dynamic characteristics, the vibration resistance and the motion response agility. With the implementation of the "Made in China 2025" policy, high-end assembly is also increasingly dominated by quality. It is especially important to implement the detection of the contact interface. A junction surface force distribution detecting method disclosed in related patents mostly uses a pressure-sensitive film as a means for measuring the contact pressure distribution within the contact interface, but the pressure-sensitive film itself has changed the interface condition, and finally it is difficult to analyze the measurement result. The method of ultrasonically detecting the contact interface is of non-destructive detection, and the detection task can be completed without changing the interface contact state. Therefore, this method of ultrasonically detecting the state of the contact interface will be the focus of the field of high-end assembly.

In terms of ultrasonic detection, most of the existing curve construction methods use the average pressure of a region to characterize an eigenvalue of the ultrasonic reflectivity. To some extent, an error will be generated during curve construction, which makes the final test result less accurate. By using the rounded flat punch contact theory [微软用户1], the more accurate pressure distribution can be used to correspond to the ultrasonic reflectivity, and an iterative method can be used to further eliminate the error. By means of the method of multiple error eliminations, the finally obtained ultrasonic reflectivity-pressure relation curve is more accurate, which has a strong guiding significance for the pressure distribution measurement of the interface.

For the loading testbed, most of the existing loading test pieces are of a holistic form, followed by the problems such as large volume, waste of materials and the like, and are relatively high in cost especially for test pieces such as titanium alloy as a detection material. At the same time, an eccentric load caused by a linear movement error during loading can not be effectively processed, and a certain amount of error is caused to the detection result. However, a loading test piece of the present invention is set to an assembly type, and the detection effect can be realized just by one test piece (Φ20 mm×25 mm). In the meantime, by means of the design of a indenter, the influence on the error caused by the eccentric load can be effectively reduced by adopting a self-balancing method.

SUMMARY OF THE INVENTION

The objective of the present invention is to overcome the defects of the pressure sensitive film detection and to overcome the errors caused by an average pressure mode, and thus to provide an interface ultrasonic reflectivity-pressure relation curve establishment method and a loading testbed. According to the present invention, a corresponding relation between the ultrasonic reflectivity and the pressure can be understood more accurately, and the errors caused by measurement, movement and the like can be reduced by using a method of taking an average from multiple collections at the same point.

The present invention adopts the following technical means:

an interface ultrasonic reflectivity-pressure relation curve establishment method comprises the following steps:

S1, placing a loading surface in the center of a loading system, determining a position of the loading system by using a laser probe, and determining coordinate of the center of the loading system to obtain coordinate $O_1$ of the center of the loading surface;

wherein the loading surface is a flat punch with rounded corner;

S2, scanning a condition at the loading surface under the same scanning path by using a immersion ultrasonic transducer respectively in cases of no load and different force to obtain a zero point signal and a characteristic signal, and calculating the ultrasonic reflectivity by using a ratio of the characteristic signal to the zero point signal to obtain a distribution curve of the ultrasonic reflectivity, as shown in a formula (1):

$$R = f_1(r) \tag{1}$$

wherein r is a distance between scanning area and $O_1$;

R is an average value of the ultrasonic reflectivity of the scanning area corresponding to r;

wherein the scanning path is a radial path including a plurality of sub-paths, wherein the sub-path refers to starting from the center of the loading surface, reaching the boundary of the loading surface along a straight line, and then returning to the center of the loading surface from the boundary of the loading surface along a straight line;

S3, recalibrating the center of the loading surface by using the characteristic where the distribution of the ultrasonic reflectivity is concentric circles to obtain the coordinates $O_2$ of the center of the loading surface; if $O_1$ and $O_2$ coincide, performing step S4; if $O_1$ and $O_2$ do not coincide, performing the step S2;

S4, determining a boundary characteristic value $a_i$ of the distribution boundary of the ultrasonic reflectivity according to the distribution of the ultrasonic reflectivity, and calculating an average boundary characteristic value a, wherein $a_i$ is a distance between the distribution boundary of the ultrasonic reflectivity and $O_2$;

S5, determining a pressure value of each scanning area, and then obtaining the corresponding relation between the distance r, which between the scanning area and $O_2$, and the pressure P, as shown in formula (2):

$$P = f_2(r) \tag{2}$$

S6, deducing a corresponding relation of R and P according to the formula (1) and formula (2) to obtain an initial ultrasonic reflectivity-pressure relation curve, as shown in formula (3):

$$P = f_3(R) \tag{3};$$

S7, calculating the pressure values $P'_i$ under different force by using the initial ultrasonic reflectivity-pressure relation curve according to the formula (3), and calculating a calculated total load $W'_i$ by means of an integral method, $$W'_i = \int P'_i \, dx \, dy \tag{4}$$

dividing an actual load $W_i$ measured by a force sensor by the calculation total load $W'_i$ to obtain a plurality of correction coefficients $K_i$ corresponding to different force, and taking an average value of the correction coefficients $K_i$ to obtain an average correction coefficient K, wherein $$K_i = \frac{W_i}{W'_i}; \quad (5)$$

and

S8, correcting the initial reflectivity-pressure relation curve by using the average correction coefficient K to obtain a final reflectivity-pressure relation curve:

$$P_i = K_i \times P'_i \quad (6).$$

In an operating state, the ultrasonic transceiver generates an excitation which is then transferred to the immersion ultrasonic transducer; the immersion ultrasonic transducer generates an ultrasonic signal, then scans the condition at the loading surface under the same scanning path by using the immersion ultrasonic transducer in cases of no load and different force respectively, and receives an ultrasonic return signal; the immersion ultrasonic transducer converts the ultrasonic return signal into a voltage signal and transmits the voltage signal to the ultrasonic transceiver; the ultrasonic transceiver transmits the voltage signal to the oscilloscope; the oscilloscope displays the voltage signal and transmits it to the control terminal.

In the step S2, the zero point signal is obtained in following manner:

the condition at the loading surface is scanned under a scanning path by using the immersion ultrasonic transducer in cases of no load, and the obtained ultrasonic return signal is used as the zero point signal.

In the step S2, the characteristic signal is obtained in following manner:

the condition at the loading surface is scanned under a scanning path by using the immersion ultrasonic transducer in cases of different force, wherein the obtained ultrasonic return signal is used as the characteristic signal, the different force include a plurality of gradually increasing force, and the absolute values of the difference of the adjacent force are equal.

In the step S2, calculating the ultrasonic reflectivity by using the ratio of the characteristic signal to the zero point signal refers to:

performing fast Fourier transform on the zero point signal and the characteristic signal, and calculating the corresponding ultrasonic reflectivity by using a formula (7) to obtain the reflectivity distribution under the scanning path, wherein, the formula (7) is:

$$R_i = \frac{h_i}{H_i}; \quad (7)$$

$R_i$ is an ultrasonic reflectivity, $h_i$ is the amplitude of the characteristic signal, and $H_i$ is the amplitude of the zero point signal;

due to the characteristics of the sub-paths, the same position of the loading surface is scanned twice, and the average value of the ultrasonic reflectivity is taken to establish a reflectivity distribution curve $R=f_1(r)$.

In the step S6, the corresponding relation of R and P is deduced in following manner:

Calculating a pressure distribution curve under the corresponding force by using a formula (8) and the a obtained in the step S4, and obtaining an initial ultrasonic reflectivity-pressure relation curve by fitting the ultrasonic reflectivity distribution curve with the pressure distribution curve;

wherein the formula (8) is:

$$p(r) = \frac{2k}{\pi A}\begin{cases}\int_b^a \frac{\left(2\sqrt{s^2-b^2}-b\arccos\frac{b}{s}\right)ds}{\sqrt{s^2-r^2}}, 0<r<b \\ \int_r^a \frac{\left(2\sqrt{s^2-b^2}-b\arccos\frac{b}{s}\right)ds}{\sqrt{s^2-r^2}}, b<r<a\end{cases} \quad (8);$$

$$k = \frac{1}{R_c}, A = 2\left(\frac{1-V_1^2}{E_1}+\frac{1-V_2^2}{E_2}\right);$$

in which, $V_i$ is Poisson's ratio of a material; $E_i$ is Young's modulus of the material; a is an average boundary characteristic value; $R_c$ is a rounded radius of the rounded surface of the flat punch with rounded corner; b is a radius of the flat punch of the flat punch with rounded corner; s is a characteristic variable.

A loading testbed for an interface ultrasonic reflectivity-pressure relation curve establishment method, comprises a force displayer, a control terminal, an oscilloscope, a immersion ultrasonic transducer, a large cylinder, a small cylinder, an upper panel, a movable plate, a force sensor, a lower panel, an ultrasonic transceiver and a small cylinder connecting plate;

the axes of the large cylinder, the small cylinder and the loading testbed are located on the same straight line;

two vertical guide columns are arranged between the upper panel and the lower panel; the movable plate is located between the upper panel and the lower panel and is slidably connected to the two vertical guiding columns; the lower surface of the movable plate is provided with the force sensor; the small cylinder connecting plate is located between the movable plate and the upper panel; the lower surface of the small cylinder connecting plate is provided with a indenter; the upper surface of the small cylinder connecting plate is provided with the small cylinder; the upper surface of the movable plate is provided with a connecting groove connected to the indenter; the lower surface of the upper panel is provided with a large cylinder connecting plate; the lower surface of the large cylinder connecting plate is provided with a threaded hole connected to the large cylinder; the upper panel is provided with a water channel allowing the immersion ultrasonic transducer to be inserted; the water channel passes through the large cylinder connecting plate and is communicated with the threaded hole;

the force displayer is electrically connected to the force sensor; the control terminal is electrically connected to the oscilloscope; the oscilloscope is electrically connected to the ultrasonic transceiver; the ultrasonic transceiver is electrically connected to the immersion ultrasonic transducer;

in an operating state, the ultrasonic transceiver generates an excitation which is then transferred to the immersion ultrasonic transducer located in the water channel; the immersion ultrasonic transducer generates an ultrasonic signal to scan the upper surface of the small cylinder, and receives an ultrasonic return signal; the immersion ultrasonic transducer converts the ultrasonic return signal into a voltage signal and transmits the voltage signal to the ultrasonic transceiver; the ultrasonic transceiver transmits the voltage signal to the oscilloscope; the oscilloscope displays and transmits the voltage signal to the control terminal.

The model of the oscilloscope is TDS3012C, the model of the immersion ultrasonic transducer is OLYMPUS V312-0.25-10 MHz-PTF, and the model of the ultrasonic transceiver is PR5700.

The upper surface of the small cylinder has a rounded surface which is connected to the side surface of the small cylinder, and a rounded radius of the rounded surface is 1.5 mm.

A sealing ring is arranged between the threaded hole and the large cylinder.

The oscilloscope is connected to the control terminal via GPIB lines.

Compared with the existing schemes, the interface ultrasonic reflectivity-pressure relation curve establishment method and the loading testbed provided by the present invention can construct a more accurate ultrasonic reflectivity-pressure relation curve, and have high detection precision.

Based on the above reasons, the present invention may be widely spread in the field of ultrasonic detection and the like.

BRIEF DESCRIPTION OF THE DRAWINGS

In order to illustrate the technical solutions in the embodiments provided by the present invention and in the prior art more clearly, a brief introduction may be given hereinafter to the accompany drawings that may be used in the description of the embodiments or the prior art. Apparently, the drawings in the description below are some embodiments of the present invention, and other drawings may be obtained by an ordinary person skilled in the art according to these drawings without paying any creative labor.

DETAILED DESCRIPTIONS OF THE PREFERRED EMBODIMENTS

Figure 1:
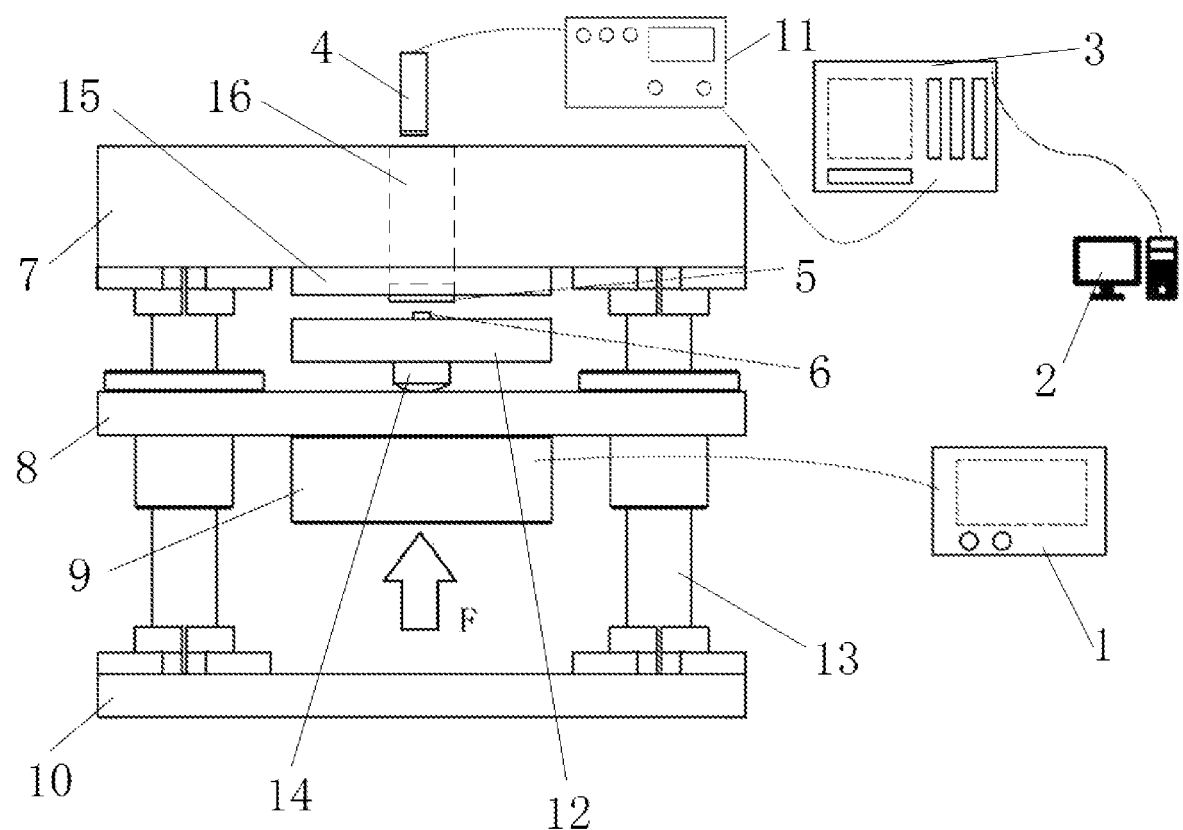
FIG. 1 is a loading testbed for an interface ultrasonic reflectivity-pressure relation curve establishment method in an embodiment of the present invention.
Figure 2:
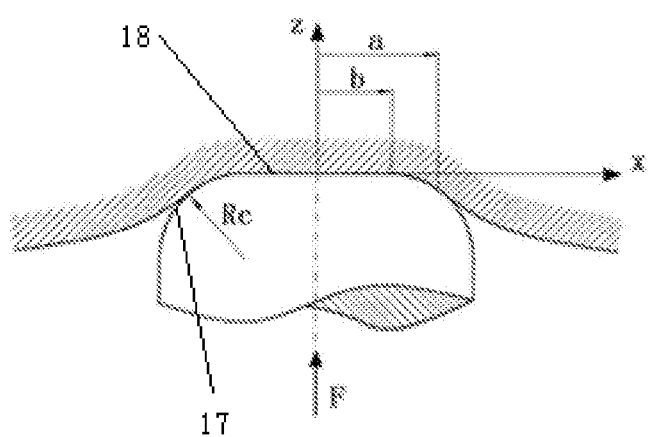
FIG. 2 is a schematic diagram when a large cylinder is subject to contact loading with the small cylinder in an embodiment of the present invention.

To make the objectives, technical solutions and advantages of the embodiments of the present invention clearer, the technical solutions in the embodiments of the present invention will be described clearly and completely with reference to the accompanying drawings in the embodiments of the present invention. Apparently, the described embodiments are a part, but not all of the embodiments of the present invention. All other embodiments obtained by an ordinary person skilled in the art based on the embodiments of the present invention without paying creative labor shall fall within the protection scope of the present invention.

As shown in FIGS. 1 to 5, an interface ultrasonic reflectivity-pressure relation curve establishment method. This method is implemented by a loading testbed for the interface ultrasonic reflectivity-pressure relation curve establishment method. The loading testbed comprises a force displayer 1, a control terminal 2, an oscilloscope 3, an immersion ultrasonic transducer 4, a large cylinder 5, a small cylinder 6, an upper panel 7, a movable plate 8, a force sensor 9, lower panel 10, an ultrasonic transceiver 11 and a small cylinder connecting plate 12.

The axes of the large cylinder 5, the small cylinder 6 and the loading testbed are located on the same straight line.

Two vertical guide columns 13 are arranged between the upper panel 7 and the lower panel 10. The movable plate 8 is located between the upper panel 7 and the lower panel 10 and is slidably connected to the two vertical guide columns 13. The lower surface of the movable plate 8 is provided with the force sensor 9. The small cylinder connecting plate 12 is located between the movable plate 8 and the upper panel 7. The lower surface of the small cylinder connecting plate 12 is provided with a indenter 14. The upper surface of the small cylinder connecting plate 12 is provided with the small cylinder 6. The upper surface of the movable plate 8 is provided with a connecting groove connected to the indenter 14. The lower surface of the upper panel 7 is provided with a large cylinder connecting plate 15. The lower surface of the large cylinder connecting plate 15 is provided with a threaded hole connected to the large cylinder 6. The upper panel 7 is provided with a water channel 16 allowing the immersion ultrasonic transducer 4 to be inserted. The water channel 16 passes through the large cylinder connecting plate 15 and is communicated with the threaded hole.

The force sensor 9 can be pushed by hydraulic cylinder to further push the movable plate 8 to move, such that the small cylinder 6 is pressed on the large cylinder 5.

The force displayer 1 is electrically connected to the pressure sensor 9. The control terminal 2 is electrically connected to the oscilloscope 3. The oscilloscope 3 is electrically connected to the ultrasonic transceiver 11. The ultrasonic transceiver 11 is electrically connected to the immersion ultrasonic transducer 4.

The model of the oscilloscope 3 is TDS3012C, the model of the immersion ultrasonic transducer 4 is OLYMPUS V312-0.25-10 MHz-PTF, and the model of the ultrasonic transceiver 11 is PR5700.

The upper surface of the small cylinder 6 is provided with a rounded surface 17, which is connected to the side surface of the small cylinder 6, and a flat punch 18. A rounded radius of the rounded surface 17 is 1.5 mm, and a diameter of the flat punch 18 is 10 mm.

A sealing ring is arranged between the threaded hole and the large cylinder 5 and used for preventing water from flowing out from a space between the threaded hole and the large cylinder 5.

The oscilloscope 3 is connected to the control terminal 2 via a GPIB line.

Figure 3:
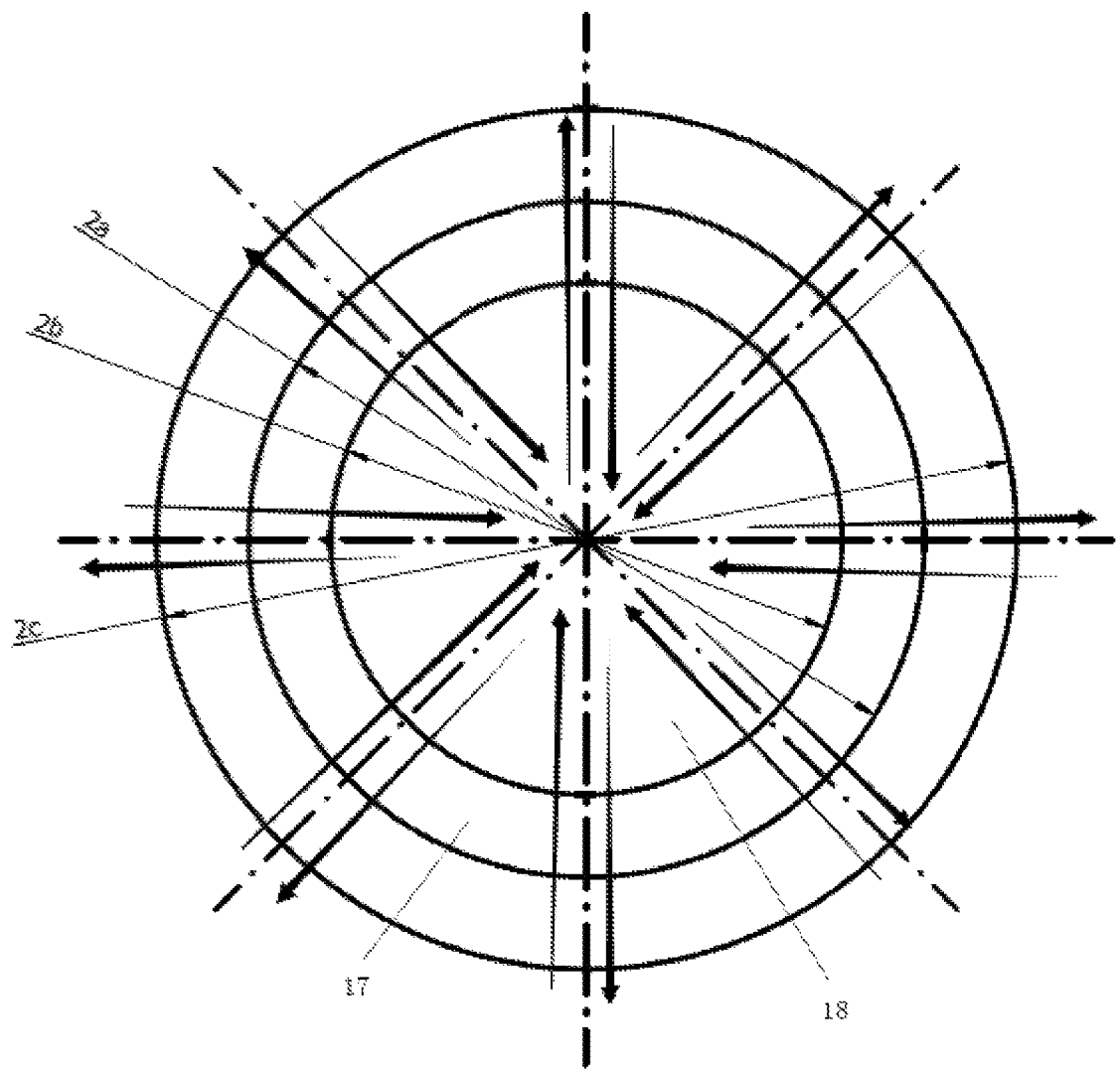
FIG. 3 is a schematic diagram of a radial path in a specific embodiment of the present invention.

The method comprises following steps:

S1, placing a loading surface (the upper surface of the small cylinder 6, similarly hereinafter) in the center of a loading system, determining a position of the loading system by using a laser probe, and determining coordinate of the center of the loading system to obtain coordinate $O_1$ of the center of the loading surface;

wherein the loading surface is a flat punch with rounded corner, and the upper surface of the small cylinder 6 is a flat punch with rounded corner;

S2, scanning a condition at the loading surface under the same scanning path by using a immersion ultrasonic transducer 4 in cases of no load and different force respectively to obtain a zero point signal and a characteristic signal, and calculating the ultrasonic reflectivity by using a ratio of the characteristic signal to the zero point signal to obtain a distribution curve of the ultrasonic reflectivity, as shown in a formula (1):

$$R = f_1(r) \quad (1)$$

wherein r is a distance between a scanning area and $O_1$;

R is an average value of the ultrasonic reflectivity of the scanning area corresponding to r;

the scanning path is a radial path, including eight sub-paths, as shown by a turn back arrow in FIG. 3, each sub-path refers to starting from the center of the loading surface, reaching the boundary of the loading surface along a straight line, and then returning to the center of the loading surface from the boundary of the loading surface along a straight line;

S3, recalibrating the center of the loading surface by using the characteristic where the distribution of the ultrasonic reflectivity is concentric circles to obtain the coordinate $O_2$ of the center of the loading surface; if $O_1$ and $O_2$ coincide, performing a step S4; if $O_2$ and $O_2$ do not coincide, performing the step S2;

S4, determining a boundary characteristic value $a_i$ of the distribution boundary of the ultrasonic reflectivity according to the distribution of the ultrasonic reflectivity, and calculating an average boundary characteristic value a, wherein $a_i$ is a distance between the distribution boundary of the ultrasonic reflectivity and $O_2$;

S5, determining a pressure value of each scanning area, and then obtaining the corresponding relation between the distance r, which between the scanning area and $O_2$, and the pressure P, as shown in formula (2):

$$P = f_2(r) \quad (2)$$

S6, deducing a corresponding relation of R and P according to the formula (1) and the formula (2) to obtain an initial ultrasonic reflectivity-pressure relation curve, as shown in formula (3):

$$P = f_3(R) \quad (3);$$

S7, calculating the pressure values $P'_i$ under different force by using the initial ultrasonic reflectivity-pressure relation curve according to formula (3), and calculating a calculated total load $W'_i$ by means of an integral method, $$W'_i = \int P'_i dx dy \quad (4)$$

dividing an actual load $W_i$ measured by a force sensor 9 by the calculation total load $W'_i$ to obtain a plurality of correction coefficients $K_i$ corresponding to different force, and taking an average value of the correction coefficients $K_i$ to obtain an average correction coefficient K, wherein $$K_i = \frac{W_i}{W'_i}; \quad (5)$$

and

Figure 5:
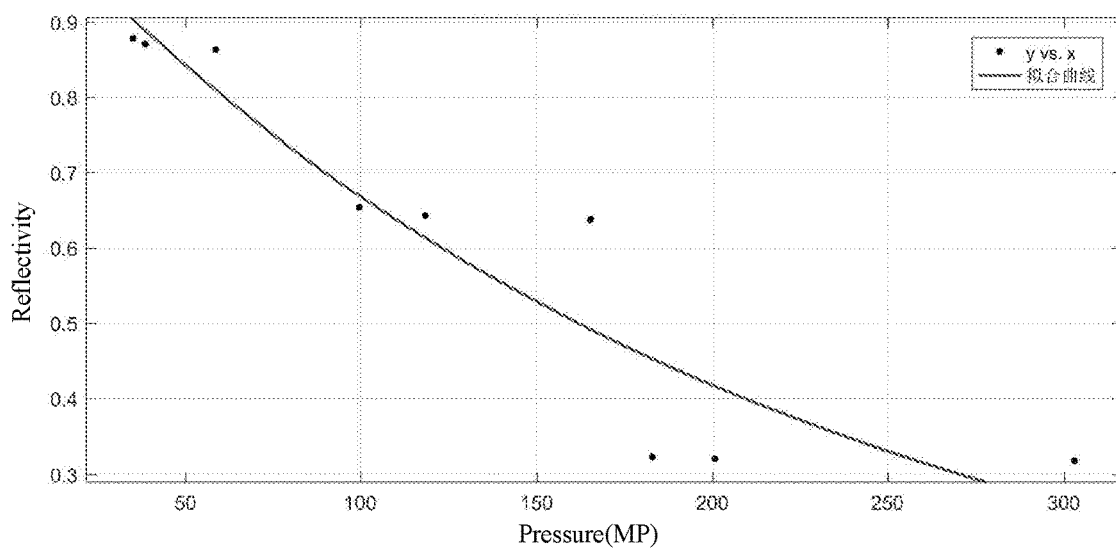
FIG. 5 is a reflectivity-pressure relation curve in an embodiment of the present invention.

S8, correcting the initial reflectivity-pressure relation curve by using the average correction coefficient K to obtain a final reflectivity-pressure relation curve (as shown in FIG. 5):

$$P_i = K_i \times P_i \quad (6).$$

In the step S2, the zero point signal is obtained in following manner:

the condition at the loading surface is scanned under a scanning path by using the immersion ultrasonic transducer 4 in cases of no load, and the obtained ultrasonic return signal is used as the zero point signal.

In the step S2, the characteristic signal is obtained in following manner:

the condition at the loading surface is scanned under a scanning path by using the immersion ultrasonic transducer 4 in cases of different force, wherein the obtained ultrasonic return signal is used as the characteristic signal, the different force include a plurality of gradually increasing force, and the absolute value of the difference values of the adjacent force are equal. In the present embodiment, the different force are 200 MP, 400 MP and 600 MP.

In the step S2, calculating the ultrasonic reflectivity by using the ratio of the characteristic signal to the zero point signal refers to:

performing fast Fourier transform on the zero point signal and the characteristic signal, and calculating the corresponding ultrasonic reflectivity by using a formula (7) to obtain the reflectivity distribution under the scanning path, wherein, the formula (7) is:

$$R_i = \frac{h_i}{H_i}; \quad (7)$$

$R_i$ is an ultrasonic reflectivity, A is the amplitude of the characteristic signal, and $H_i$ is the amplitude of the zero point signal.

Due to the characteristics of the sub-paths, the same position of the loading surface is scanned twice, and the average value of the ultrasonic reflectivity is taken to establish a reflectivity distribution curve $R = f_1(r)$.

Figure 4:
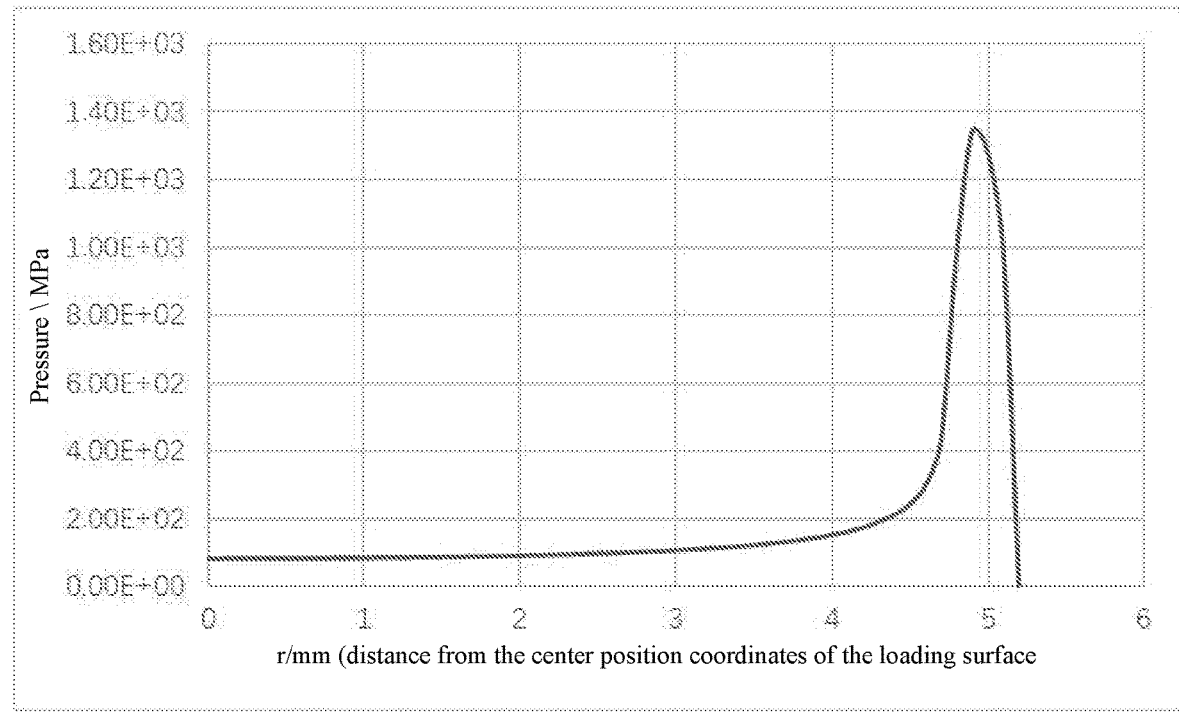
FIG. 4 is a pressure distribution curve in an embodiment of the present invention.

In the step S6, the corresponding relation of R and P is deduced in following manner:

Calculating a pressure distribution curve under the corresponding force by using a formula (8) and the a obtained in the step S4, and, as shown in FIG. 4, obtaining an initial ultrasonic reflectivity-pressure relation curve by fitting the ultrasonic reflectivity distribution curve with the pressure distribution curve;

wherein the formula (8) is:

$$p(r) = \frac{2k}{\pi A} \begin{cases} \int_b^a \frac{\left(2\sqrt{s^2 - b^2} - b \arccos\frac{b}{s}\right) ds}{\sqrt{s^2 - r^2}}, & 0 < r < b \\ \int_r^a \frac{\left(2\sqrt{s^2 - b^2} - b \arccos\frac{b}{s}\right) ds}{\sqrt{s^2 - r^2}}, & b < r < a \end{cases} \quad (8);$$

$$k = \frac{1}{R_c}, A = 2\left(\frac{1 - V_1^2}{E_1} + \frac{1 - V_2^2}{E_2}\right);$$

in which, $V_i$ is a Poisson's ratio of a material; $E_i$ is a Young's modulus of the material; a is an average boundary characteristic value; $R_c$ is a rounded radius of a rounded surface of a flat punch with rounded corner, i.e. the rounded radius of the rounded surface 17; b is a radius of the flat punch with rounded corner, i.e. the diameter [微软用户2] of the flat punch 18; s is a characteristic variable.

In an operating state, the ultrasonic transceiver 11 generates an excitation which is then transferred to the immersion ultrasonic transducer 4 located in the water channel 16. The immersion ultrasonic transducer 4 generates an ultrasonic signal to scan the upper surface of the small cylinder 6 under the same scanning path in cases of no load and different force respectively, and receives an ultrasonic return signal; the immersion ultrasonic transducer 4 converts the ultrasonic return signal into a voltage signal and transmits the voltage signal to the ultrasonic transceiver 11. The ultrasonic transceiver 11 transmits the voltage signal to the oscilloscope 3. The oscilloscope 3 displays and transmits the voltage signal to the control terminal 2.

It should be illustrated eventually that: the above embodiments are only used to illustrate the technical solutions of the present invention, rather than limiting them. Although the present invention has been described in detail with reference to the foregoing embodiments, an ordinary person skilled in the art should understand that: it is still possible to modify the technical solutions described in the foregoing embodiments, or to equivalently replace some or all of the technical characteristics. However, these modifications or replacements do not make the essence of the corresponding technical solution depart from the scope of the technical solutions of the embodiments of the present invention.

The invention claimed is:

1. A method for establishing an interface ultrasonic reflectivity-pressure relation curve, comprising:

S1, placing a loading surface in a loading system, determining a position of the loading system by using a laser probe, and determining a coordinate $O_1$ of a center of the loading surface, wherein the loading surface is a flat punch with rounded corner;

S2, scanning the loading surface under a scanning path by using a immersion ultrasonic transducer when no force is applied to the loading surface to obtain a zero point signal, applying a plurality of forces, one at a time, to the loading surface, scanning the loading surface along the same scanning path when each force is applied to the loading surface so as to obtain a plurality of characteristic signals, and calculating a plurality of ultrasonic reflectivity values, wherein each of the plurality of ultrasonic reflectivity values equals a ratio of one of the plurality of the characteristic signals to the zero point signal, then constructing a distribution curve of the ultrasonic reflectivity values, as shown in Equation (1):

$$R = f_1(r) \quad (1)$$

wherein r is a distance between a scanning area and $O_1$, wherein a scanning area is a location on the loading surface that is scanned, R is an average value of the ultrasonic reflectivity of the scanning area corresponding to r;

the scanning path comprises a plurality of sub-paths, wherein each sub-path starts from $O_1$ and extends to a boundary of the loading surface along a straight line, and then returns to $O_1$ along the same straight line;

S3, determining a coordinate $O_2$ that is a center of concentric circles formed by scanning areas having a same ultrasonic reflectivity, repeating S2 and S3 until when $O_1$ and $O_2$ coincide;

S4, determining a boundary characteristic value $a_i$ of a distribution boundary of the ultrasonic reflectivity, and calculating an average boundary characteristic value a, wherein $a_i$ is a distance between the distribution boundary of the ultrasonic reflectivity and $O_2$;

S5, determining a pressure value at each scanning area, and then obtaining a corresponding relation between the distance r and the pressure P, as shown in Equation (2):

$$R = f_2(r) \quad (2)$$

S6, deducing a corresponding relation of R and P according to the Equation (1) and Equation (2) to obtain an initial ultrasonic reflectivity-pressure relation curve, as shown in Equation (3):

$$R = f_3(r) \quad (3)$$

S7, for each of the plurality of forces applied to the loading surface in step S2, calculating a pressure $P'_i$ according to Equations (1) and (3), and calculating a total load $W'_i$ by integrating $P'_i$ over the loading surface according to Equation (4), $$W'_i = \int P'_i dx dy \quad (4)$$

wherein dx and dy are variables in the integral, representing a finite area on the loading surface, $W_i$ is a load on the loading surface measured by a force sensor, and calculating a coefficient $K_i$ corresponding to each of the plurality of forces applied to the loading surface in step S2 according to Equation (5), and taking an average value of the plurality of coefficients $K_i$ to obtain an average correction coefficient K, $$K_i = \frac{W_i}{W'_i}; \quad (5)$$

and

S8, correcting the initial reflectivity-pressure relation curve by using the average correction coefficient K to obtain a final reflectivity-pressure relation curve according to Equation (6):

$$P_i = K_i \times P'_i \quad (6).$$

2. The method according to claim 1, wherein, in step S2 the plurality of forces are gradually increased at a same increment.

3. The interface ultrasonic reflectivity-pressure relation curve establishment method according to claim 1, wherein, in step S2, calculating the ultrasonic reflectivity comprises: performing fast Fourier transform on the zero point signal and the characteristic signals, and calculating the corresponding ultrasonic reflectivity according to Equation (7) to obtain the reflectivity distribution along the scanning path, $$R_i = \frac{h_i}{H_i}; \quad (7)$$

in which $R_i$ is an ultrasonic reflectivity, $h_i$ is an amplitude of the characteristic signal, and $H_i$ is an amplitude of the zero point signal.

* * * * *